(12) United States Patent
Ong et al.

(10) Patent No.: US 10,176,784 B2
(45) Date of Patent: Jan. 8, 2019

(54) MULTI-MODE DISPLAY SHARING

(71) Applicants: Aik Keong Ong, Singapore (SG); Boon Kiat Law, Singapore (SG)

(72) Inventors: Aik Keong Ong, Singapore (SG); Boon Kiat Law, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/227,947

(22) Filed: Mar. 27, 2014

(65) Prior Publication Data
US 2015/0279328 A1    Oct. 1, 2015

(51) Int. Cl.
*G06F 3/14* (2006.01)
*G09G 5/12* (2006.01)
*G09G 5/14* (2006.01)
*G09G 5/00* (2006.01)

(52) U.S. Cl.
CPC ............. *G09G 5/14* (2013.01); *G06F 3/1423* (2013.01); *G06F 3/1454* (2013.01); *G09G 5/006* (2013.01); *G09G 2320/0693* (2013.01); *G09G 2320/10* (2013.01); *G09G 2370/025* (2013.01); *G09G 2370/20* (2013.01); *G09G 2370/22* (2013.01)

(58) Field of Classification Search
CPC .. G09G 5/14; G09G 5/006; G09G 2320/0693; G09G 2320/10; G06F 19/321; G06F 3/03547; G06F 3/14; G06F 3/1423; G06F 3/1454

USPC .......................... 345/1.3, 168, 174, 633, 634
See application file for complete search history.

(56) References Cited

U.S. PATENT DOCUMENTS

| | | | |
|---|---|---|---|
| 8,750,911 B2* | 6/2014 | Yang | G06F 3/1454 345/1.1 |
| 2004/0201544 A1* | 10/2004 | Love et al. | 345/1.1 |
| 2006/0044216 A1* | 3/2006 | Love | 345/1.3 |
| 2007/0120763 A1* | 5/2007 | De Paepe et al. | 345/1.3 |
| 2013/0335300 A1* | 12/2013 | Tajima | G06F 3/1454 345/2.3 |
| 2015/0067106 A1* | 3/2015 | Jaynes et al. | 709/219 |
| 2015/0113181 A1 | 4/2015 | Law et al. | 710/38 |

OTHER PUBLICATIONS

"Extended display identification data"; Wikipedia; accessed online at http://en.wikipedia.org/w/index.php?oldid=601206256; 14 pages, Mar. 25, 2014.

* cited by examiner

*Primary Examiner* — Jin-Cheng Wang
(74) *Attorney, Agent, or Firm* — Baker Botts L.L.P.

(57) ABSTRACT

A multi-mode display device may, responsive to a user-selection, divide a display region into different regions corresponding to display data received from different user devices, such as a primary information handling system and a secondary portable information handling system. First display data received from the primary information handling system may be output to a first display region and second display data received from the secondary portable information handling system maybe output to a second display region.

15 Claims, 5 Drawing Sheets

MULTI-MODE DISPLAY SHARING

BACKGROUND

Field of the Disclosure

This disclosure relates generally to information handling system displays and, more particularly, to multi-mode display sharing.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Display devices, such as liquid crystal displays (LCDs) are commonly integrated within portable information handling systems configured in the form of laptop, notebook, netbook, and tablet computers, among others, and personal mobile devices, such as smart phones. Desktop or non-portable information handling systems also use display devices, which are often implemented as separate devices with input ports for graphical display signals. As users of information handling systems increasingly own and operate multiple systems, including portable systems and personal mobile devices, it may be difficult for users to easily integrate display outputs from multiple sources into a single display device.

SUMMARY

In one aspect, a disclosed method for sharing a multi-mode display device includes detecting, at the multi-mode display device, a first connection with a primary display source and a second connection with a secondary display source. The method may include sending, to the primary display source, display mode data indicating which display modes are supported by the multi-mode display device when simultaneously outputting display data to the primary display source and the secondary display source. Responsive to sending the display mode data, the method may include receiving, from the primary display source, selection data indicating a user-selected display mode based on the display mode data. The user-selected display mode may specify a first display region and a second display region for simultaneously outputting display data on the multi-mode display device. The method may include outputting first display data received via the first connection to the first display region, and outputting second display data received via the second connection to the second display region.

Other disclosed aspects include an article of manufacture including a non-transitory computer-readable medium storing instructions executable by a processor of a multi-mode display device, and a multi-mode monitor, including a processor having access to a memory, storing instructions executable by the processor.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
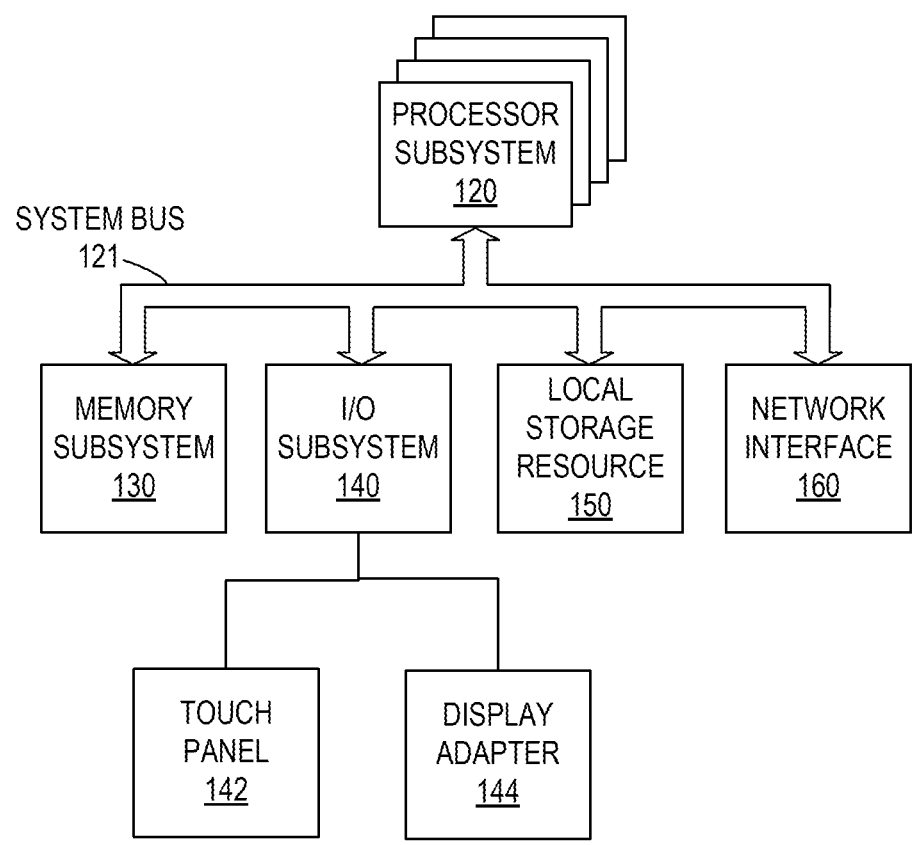
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As larger displays become more widespread with certain information handling systems, and as more uses own and operate multiple devices, including portable information handling systems and personal mobile devices, the ability to integrate display outputs of different devices on a single display screen becomes increasingly desirable. As will be described in further detail, the inventors of the present disclosure have developed methods and systems disclosed herein for multi-mode display sharing that enables a multi-mode display device (also referred to as a multi-mode monitor, or simply, a multi-mode display) to concurrently display at least two display regions where each display region corresponds to an output from a different information handling system. For example, one display region may correspond to a stationary information handling system while a second display region may correspond to a portable information handling system, such as a personal mobile device.

Particular embodiments are best understood by reference to FIGS. 1, 2, 3, 4, and 5 wherein like numbers are used to indicate like and corresponding parts.

Turning now to the drawings, FIG. 1 illustrates a block diagram depicting selected elements of an embodiment of information handling system 100. As described herein, information handling system 100 may represent a personal computing device, such as a personal computer system, a desktop computer, a laptop computer, a notebook computer, etc., operated by a user. In various embodiments, information handling system 100 may be operated by the user using a keyboard and a mouse (not shown).

As shown in FIG. 1, components of information handling system 100 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol and/or standard, including, but not limited to, transmission protocols and/or standards enumerated below with respect to the discussion of network 155. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network coupled to network interface 160 and/or various components associated therewith may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130). In the same or alternative embodiments, processor subsystem 120 may interpret and/or execute program instructions and/or process data stored remotely (e.g., in a network storage resource, not shown).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. In system 100, I/O subsystem 140 may comprise a system, device, or apparatus generally operable to receive and/or transmit data to/from/ within information handling system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with a display (see FIG. 3) that is driven by display adapter 144. It is noted that when information handling system 100 is a laptop computer with an integrated display device, display adapter 144 may provide connectivity for an external display, such as multi-mode display device 300 (see FIG. 3).

As noted previously, a user of information handling system 100 may desire to display the output from display adapter 144 as well as the output from a portable information handling system (i.e., a tablet computer) or from a personal mobile device (i.e., a smart phone) on a single display. As will be described in further detail herein, information handling system 100 and/or display adapter 144 may support operation with a multi-mode display that is enabled to simultaneously display graphical content from at least two different sources.

Figure 2:
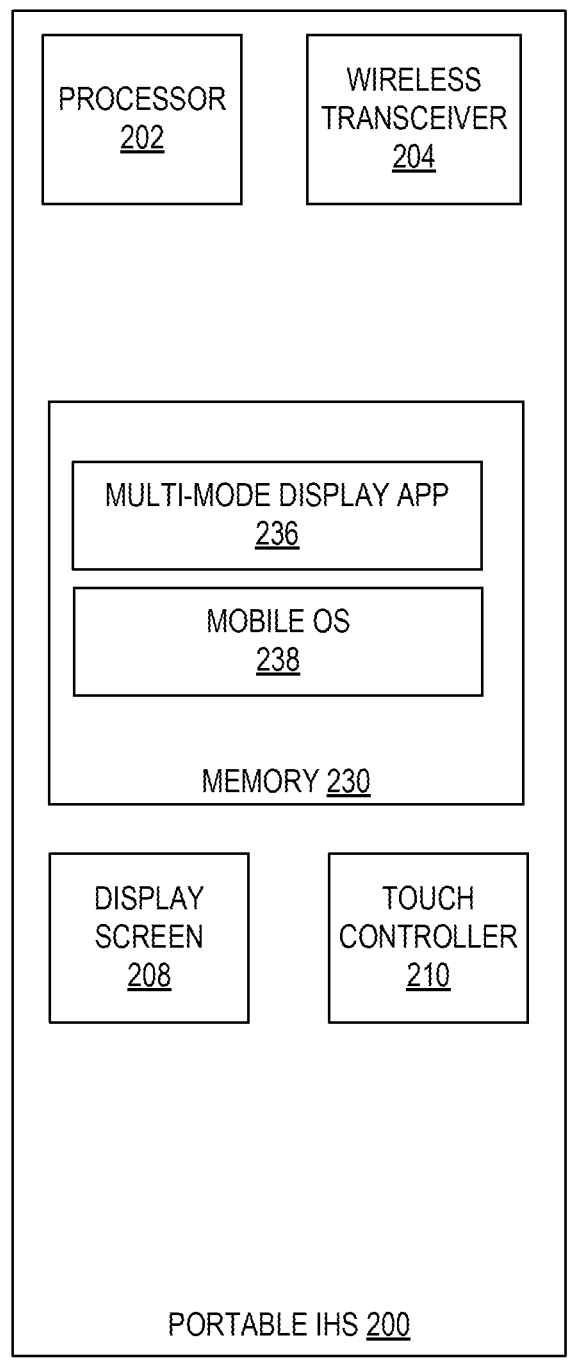
FIG. 2 is a block diagram of selected elements of an embodiment of a portable information handling system.

Turning now to FIG. 2, a block diagram of selected elements of an embodiment of portable information handling system 200 is illustrated. As shown, portable information handling system 200 may represent a handheld computing device, such as a tablet computer. More generally, portable information handling system 200 may represent any of a variety of mobile devices with communication and data processing capability. In particular embodiments, portable information handling system 200 represents a smart phone that may include various functionality selected from: cellular telephony, wireless networking, location sensing, motion sensing, digital imaging, touch screen operation, multimedia playback, data storage, among others. Accordingly, while certain aspects of portable information handling system 200 are shown in FIG. 2 for descriptive purposes, it will be understood that in different embodiments, portable information handling system 200 may include different types of functionality.

As shown in FIG. 2, portable information handling system 200 includes processor 202 and memory 230 that may store data and/or instructions executable by processor 202. Memory 230 is shown including mobile OS 238, which may represent a mobile operating system being executed by processor 202. Examples of instances of mobile OS 238 include iOS (Apple Inc.) and Android™ (Google Inc.). Also, memory 230 may store multi-mode display app 236 that is executable by processor 202 to enable sending display output to a multi-mode monitor, as described herein. It is noted that various apps (not shown) may execute on portable information handling system 200 to access diverse types of functionality included with portable information handling system 200, such as, but not limited to, imaging, communication, location-based services, gestures, touch input, motion of portable information handling system 200, Internet connectivity, etc.

In FIG. 2, portable information handling system 200 may include wireless transceiver 204, which may provide wireless connectivity to various types of wireless networks, such as cellular telephony networks (e.g., 3G, 4G), wireless local area networks (e.g., IEEE 802.11), wireless personal area networks (e.g., Bluetooth®), among others. Display screen 208 and touch controller 210 may operate in combination to provide a touch screen display for output to and control by a user.

In operation, portable information handling system 200 may be enabled to send display data that is output on display screen 208 to a multi-mode monitor via wireless transceiver 204, which the multi-mode monitor is configured to receive and output on a display region.

Figure 3:
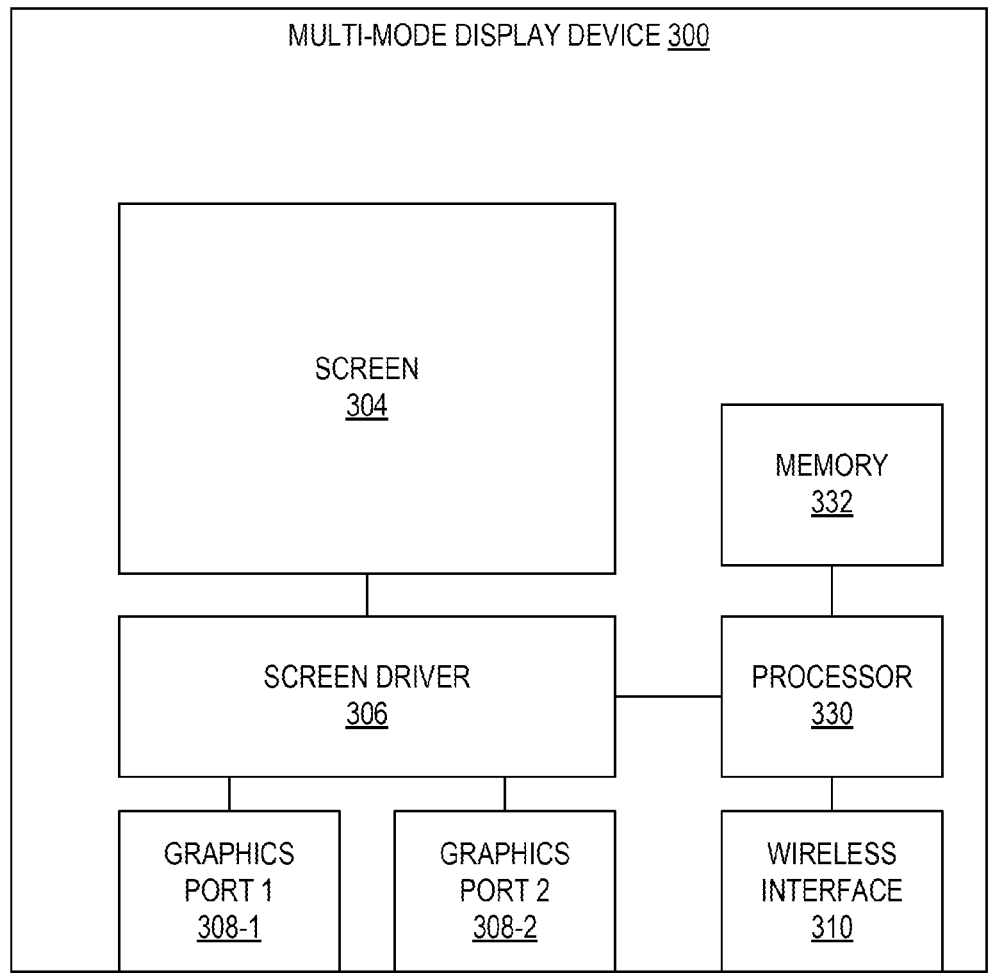
FIG. 3 is a block diagram of selected elements of an embodiment of a multi-mode display device.

Turning now to FIG. 3, a block diagram of selected elements of an embodiment of multi-mode display device 300 is illustrated. In some embodiments, multi-mode display device 300 may represent a stand-alone device that may be coupled to one or more information handling systems to output display data. In certain embodiments, multi-mode display device 300 may be a display integrated within a laptop or a notebook. As used herein, the term "output" with regard to display data shall refer to display of optical elements (i.e., pixels) representing the display data on a screen and may represent a continuing process where the display data is constantly updated at a given refresh rate.

As shown in FIG. 3, multi-mode display device 300 accordingly includes screen 304 and screen driver 306. Screen 304 may represent any of a variety of display screens and may be implemented in a fixed resolution (see also FIG. 4) corresponding to a number of pixels included within screen 304. Screen driver 306 may include processing capability to receive display data and generate corresponding control signals to drive screen 304. In some embodiments, screen 304 may include an actively illuminated element, such as a backlight (not shown). Screen 304 may be implemented using various types of display technology, including, but not limited to, light-emitting diodes (LED), liquid crystal displays (LCD), plasma displays, etc.

In FIG. 3, multi-mode display device 300 is shown including two graphics ports 308, namely graphics port 1 308-1 and graphics port 2 308-2. The two graphics ports 308 may represent wired interfaces for receiving display data from an information handling system (e.g., via display adapter 144, see FIG. 1) and may be different types of ports or two instances of the same type of port. Graphics ports 308 may be analog ports (e.g., video graphics adapters (VGA), among others) or digital ports (e.g., digital video interface (DVI), high-definition multimedia interface (HDMI), among others). Particularly when graphics ports 308 are digital ports, graphics ports 308 may support bidirectional communication with an information handling system to both receive display data and to send/receive other information, such as display control information, including extended display identification data (EDID).

In multi-mode display device 300, processor 330 and memory 332 represent data processing functionality where memory 332 may store data and/or instructions executable by processor 330. Processor 330 may also communicate with screen driver 306, which may also include processing functionality (not shown). In certain embodiments, processor 330 may be coupled to graphics ports 308, either via screen driver 306 as shown in FIG. 3 and/or directly. Also shown in multi-mode display device 300 is wireless interface 310, which may represent a suitable wireless interface for receiving display data, for example, from wireless transceiver 204 of portable information handling system 200 (see FIG. 2).

In operation, multi-mode display device 300 may be set up to receive display data from an information handling system, such as information handling system 100 (see FIG. 1) via graphics ports 308. When a personal mobile device of a user, such as portable information handling system 200, is within operational proximity of wireless interface 310, multi-mode display device 300 may segment screen 304 into at least two display regions where one display region corresponds to the output from information handling system 100 and another display region corresponds to the output from portable information handling system 200. The two display regions may thus concurrently and/or simultaneously output display data corresponding to both user devices, which may be desirable by the user. In order to provide the user with certain display options for the display regions, multi-mode display device 300 may further communicate with information handling system 100 and/or portable information handling system 200 to coordinate desired resolutions and screen orientations, as will now be described in further detail with respect to FIG. 4.

Figure 4:
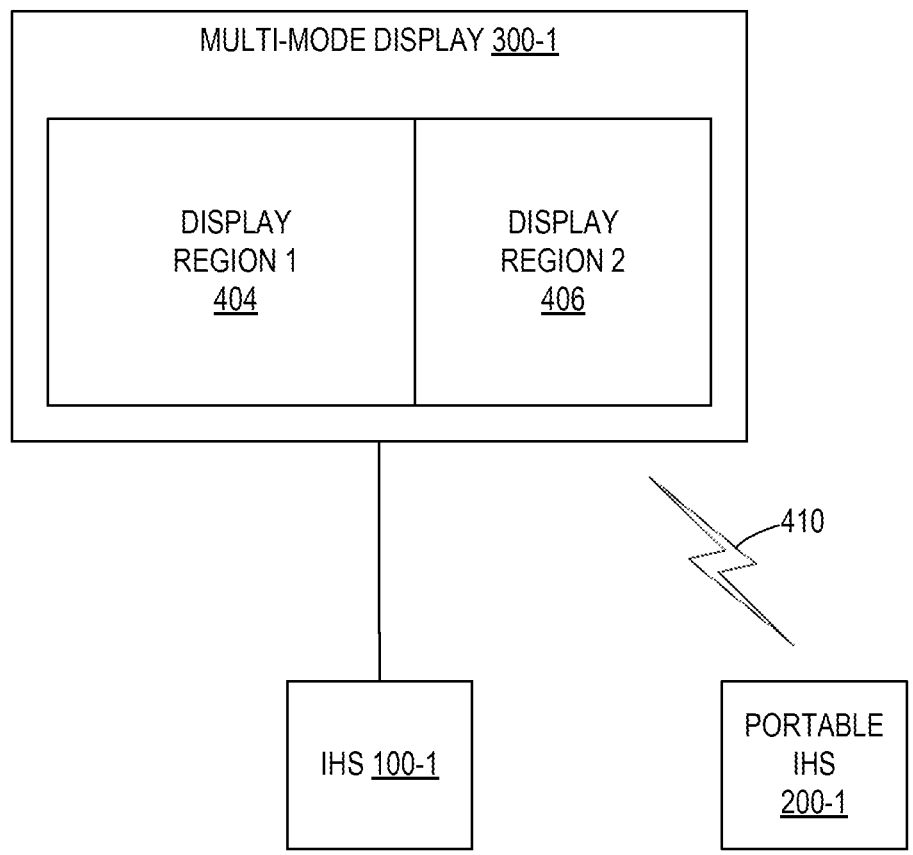
FIG. 4 is a block diagram of selected elements of an embodiment of a multi-mode display system.

Referring now to FIG. 4, a block diagram of selected elements of an embodiment of multi-mode display system 400 is illustrated. As shown, multi-mode display system 400 includes multi-mode display 300-1, information handling system 100-1, and portable information handling system 200-1. Multi-mode display 300-1 may represent an embodiment of multi-mode display device 300 (see FIG. 3). Information handling system 100-1 may represent an embodiment of information handling system 100 (see FIG. 1). Portable information handling system 200-1 may represent an embodiment of portable information handling system 200 (see FIG. 2, also referred to as a mobile device or a personal mobile device). In FIG. 4, wireless link 410 may represent a direct wireless interface between portable information handling system 200-1 and multi-mode display 300-1, as described previously.

In conventional operation of multi-mode display system 400 in FIG. 4, multi-mode display 300-1 may be operated with information handling system 100-1 to output a single display region corresponding to a user interface of information handling system 100-1. When portable information handling system 200-1 is within an operational vicinity of wireless link 410, multi-mode display 300-1 may reconfigure the display region to simultaneously output display region 1 404 and display region 2 406. Display region 1 404 may correspond to display data received from information handling system 100-1, while display region 2 406 may correspond to display data received via wireless link 410 from portable information handling system 200-1.

It is noted that display region 1 404 and display region 2 406 are shown in FIG. 4 with arbitrary size and orientation for descriptive generality. In various embodiments, the arrangement of display region 1 404 and display region 2 406 may be different than shown in FIG. 4, and may depend upon overall display properties of multi-mode display 300-1. For example, display region 2 406 may be output on a left half of multi-mode display 300-1. In some embodiments, multi-mode display 300-1 may itself be in portrait mode, such that display region 1 404 and display region 2 406 are vertically adjacent to one another. Certain examples of particular pixel resolutions, among other possible resolutions, for display region 1 404 are given below in Table 1.

TABLE 1

Non-limiting examples of resolution of display region 1 404

| Description | Aspect Ratio | Resolution [pixels] |
|---|---|---|
| standard-wide | 16:9 | 2560 × 1440 |
|  |  | 3840 × 2160 |
| ultra-wide | 21:9 | 3440 × 1440 |
| near-square | about 1:1 | 1720 × 1440 |
|  |  | 1680 × 1440 |
|  |  | 2520 × 2160 |

Certain examples of particular pixel resolutions, among other possible resolutions, for display region 2 406 are given below in Table 2.

TABLE 2

Non-limiting examples of resolution of display region 2 406

| Description | Aspect Ratio | Resolution [pixels] |
|---|---|---|
| near-square | about 1:1 | 1720 × 1440 |
|  |  | 1680 × 1440 |
|  |  | 2520 × 2160 |

TABLE 2-continued

Non-limiting examples of resolution of display region 2 406

| Description | Aspect Ratio | Resolution [pixels] |
|---|---|---|
| portrait | 11:18 | 880 × 1440 |
|  |  | 1320 × 2160 |
| floating | any | any |

Based on the resolutions given in Tables 1 and 2, non-limiting exemplary combinations of display regions that may be used with multi-mode display system 400 are given below in Table 3.

TABLE 3

Non-limiting examples of multi-mode resolution of multi-mode display 300-1

| Overall Display Size | Display Region 1 404 [pixels] | Display Region 2 406 [pixels] |
|---|---|---|
| 3440 × 1440 (21:9) | 1720 × 1440 (near-square) | 1720 × 1440 (near-square) |
| 3440 × 1440 (21:9) | 2560 × 1440 (standard-wide) | 880 × 1440 (portrait) |
| 3440 × 1440 (21:9) | 3440 × 1440 (ultra-wide) | any (floating) |
| 3440 × 1440 (21:9) | 3440 × 1440 (ultra-wide) | none |
| 2560 × 1440 (16:9) | 1680 × 1440 (near-square) | 880 × 1440 (portrait) |
| 2560 × 1440 (16:9) | 2560 × 1440 (standard-wide) | any (floating) |
| 2560 × 1440 (16:9) | 2560 × 1440 (standard-wide) | none |
| 3840 × 2160 (16:9) | 2520 × 2160 (near-square) | 1320 × 2160 (portrait) |
| 3840 × 2160 (16:9) | 3840 × 2160 (standard-wide) | any (floating) |
| 3840 × 2160 (16:9) | 3840 × 2160 (standard-wide) | none |

It is noted that in certain embodiments, more than one floating display region may be used. For example when multi-mode display 300-1 is at least about 30 inches in diameter and has at least 3840×2160 resolution, a third display region (not shown) in the form of a second floating display region may be used to output display data from an additional portable information handling system (not shown).

In operation of multi-mode display system 400, executable code (i.e., processor-executable instructions) may be executed on multi-mode display 300-1, information handling system 100-1, and/or portable information handling system 200-1 to provide multi-mode display functionality. For example, a user may connect a personal computer (represented by information handling system 100-1) to multi-mode display 300-1 and may also establish wireless link 410 with a tablet computer (represented by portable information handling system 200-1) to multi-mode display 300-1. Then, multi-mode display 300-1 may send information handling system 100-1 supported display modes for a particular display configuration, for example, based on the options given above in Table 3. It is noted that the display options may additionally include a relative position of display region 1 404 and display region 2 406 with respect to each other (i.e., right side or left side for a particular display region). After the user selects a desired display mode, information handling system 100-1 may transmit the user selection to multi-mode display 300-1 and may set an output resolution of display adapter 144 accordingly. Multi-mode display 300-1 may then establish display region 1 404 and display region 2 406 according to the user selection and may begin to receive first display data from information handling system 100-1. The first display data may be scaled and/or otherwise processed at multi-mode display 300-1 (e.g., by screen driver 306) before outputting to display region 1 404. Concurrently and/or simultaneously second display data may be received from portable information handling system 200-1. The second display data may be scaled and/or otherwise processed at multi-mode display 300-1 (e.g., by screen driver 306) before outputting to display region 2 406.

Figure 5:
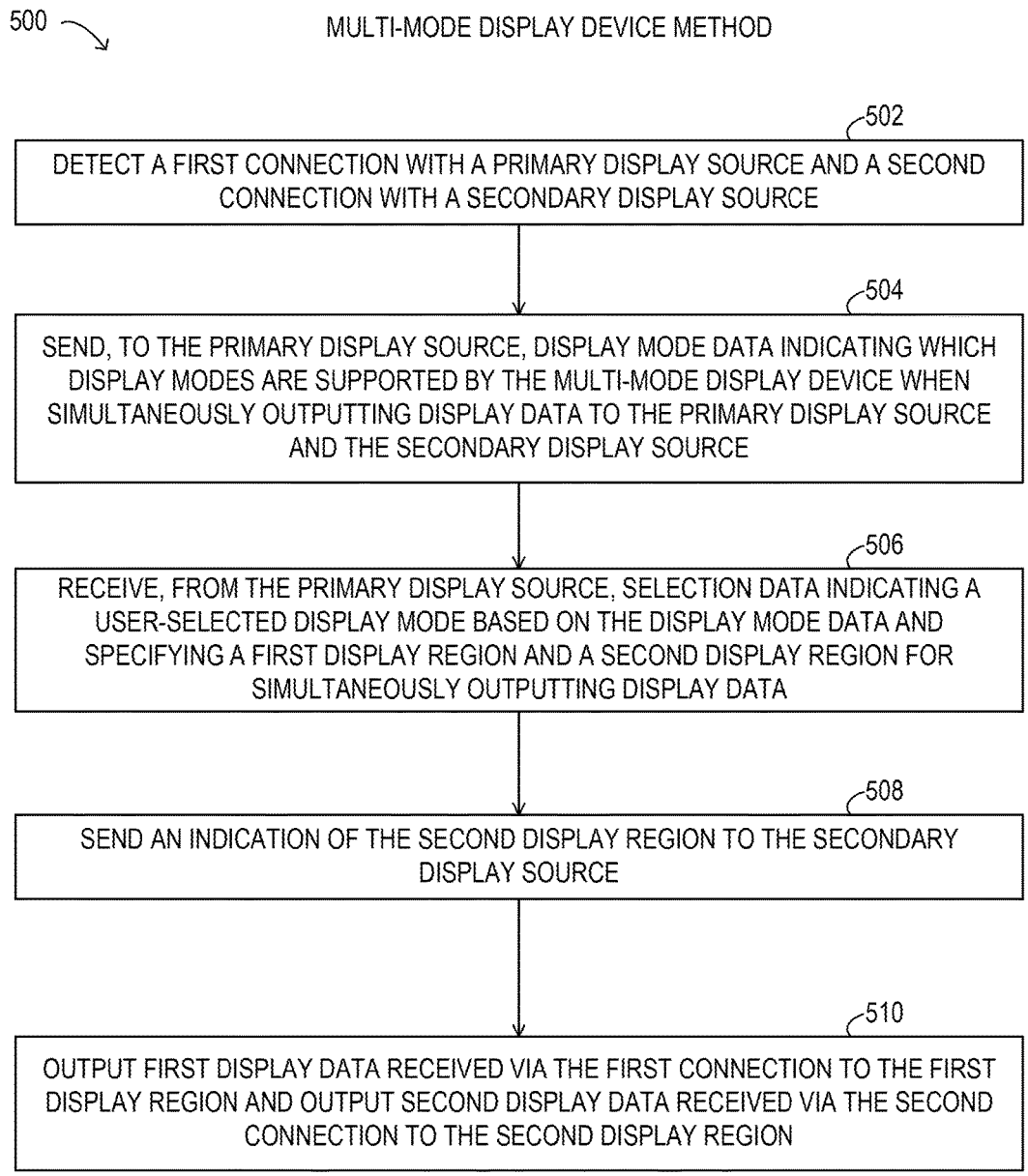
FIG. 5 is flowchart depicting selected elements of an embodiment of a method for multi-mode display sharing.

Referring now to FIG. 5, a block diagram of selected elements of an embodiment of method 500 for multi-mode display sharing, as described herein, is depicted in flowchart form. In various embodiments, method 500 is performed by multi-mode display device 300 (see FIGS. 3 and 4). It is noted that certain operations described in method 500 may be optional or may be rearranged in different embodiments.

In FIG. 5, method 500 may begin by detecting (operation 502) a first connection with a primary display source and a second connection with a secondary display source. The primary display source may be represented by information handling system 100 while the secondary display source may be represented by portable information handling system 200 (see FIGS. 1-4). Display mode data indicating which display modes are supported by the multi-mode display device when simultaneously outputting display data to the primary data source and the secondary data source may be sent (operation 504) to the primary display source. Selection data indicating a user-selected display mode based on the display mode data and specifying a first display region and a second display region for simultaneously outputting display data may be received (operation 506) from the primary display source. An indication of the second display region may be sent (operation 508) to the secondary display source. First display data received via the first connection may be output (operation 510) to the first display region and second display data received via the second connection may be output (operation 510) to the second display region.

In certain embodiments, the following operations may be performed prior to operation 510. The first connection may be deactivated and then activated. A request for extended display identification data (EDID) may be received via the first connection. The extended display identification data may be generated according to the first display region. The extended display identification data may be sent via the first connection. In this manner, the primary display source may be configured to output the user-selected display mode received in operation 506.

While multi-mode display 300-1 performs method 500, information handling system 100-1 may perform the following operations. After operation 504, options for selecting a display mode supported by the multi-mode display device may be presented to the user and an indication of the user-selected display mode may be received from the user. After operation 506, the user-selected display mode for the first display region may be set and output to the multi-mode display device.

While multi-mode display 300-1 performs method 500, portable information handling system 200-1 may perform the following operations. After operation 508, the user-selected display mode for the second display region may be set and output to the multi-mode display device.

As described herein, a multi-mode display device may, responsive to a user-selection, divide a display region into different regions corresponding to display data received from different user devices, such as a primary information handling system and a secondary portable information handling system. First display data received from the primary information handling system may be output to a first display region and second display data received from the secondary portable information handling system maybe output to a second display region.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for sharing a multi-mode display device, comprising:

detecting, at the multi-mode display device, a first connection to a primary display source;

detecting, at a wireless interface associated with the multi-mode display device, a second connection to a secondary display source when the secondary display source is within operational proximity of the wireless interface;

responsive to detecting the second connection to the secondary display source, sending, display mode data to the primary display source, wherein the display mode data indicates which display modes are supported by the multi-mode display device when simultaneously outputting display source data from the primary display source and the secondary display source;

responsive to sending the display mode data, receiving, from the primary display source, selection data indicating:

a user-selected display mode based on the display mode data, wherein the user-selected display mode specifies a first display region of the multi-mode display device and a second display region of the multi-mode display device for simultaneously outputting display source data on the multi-mode display device, wherein the first display region is the same resolution as an overall display resolution of the multi-mode display device and the second display region is a floating window of a resolution; and a relative position of the first display region relative to the second display region of the multi-mode display device;

outputting first display source data received via the first connection to the first display region at the relative position relative to the second display region; and outputting second display source data received via the second connection to the second display region.

2. The method of claim 1, further comprising:

sending an indication of the second display region to the secondary display source.

3. The method of claim 1, wherein the first display region is selected from:

standard-wide resolution;

ultra-wide resolution; and near-square resolution.

4. The method of claim 1, wherein outputting the second display source data received via the second connection includes at least one of:

scaling the second display source data to match the second display region; and setting an orientation of the second display source data to match the second display region.

5. The method of claim 1, prior to outputting the first display source data, further comprising:

deactivating and activating the first connection;
receiving, via the first connection, a request for extended display identification data;
generating the extended display identification data according to the first display region; and
sending, via the first connection, the extended display identification data.

6. An article of manufacture comprising a non-transitory computer-readable medium storing instructions, that, when executed by a processor of a multi-mode display device, cause the processor to:
   detect, at the multi-mode display device, a first connection to a primary display source;
   detect, at a wireless interface associated with the multi-mode display device, a second connection to a secondary display source when the secondary display source is within operational proximity of the wireless interface;
   responsive to the detection of the second connection to the secondary display source, send display mode data to the primary display source to indicate which display modes are supported by the multi-mode display device when simultaneously outputting display source data from the primary display source and the secondary display source;
   responsive to the instructions to send the display mode data, receive, from the primary display source, selection data indicating:
      a user-selected display mode based on the display mode data, wherein the user-selected display mode specifies a first display region of the multi-mode display device and a second display region of the multi-mode display device for simultaneously outputting display source data on the multi-mode display device, wherein the first display region is the same resolution as an overall display resolution of the multi-mode display device and the second display region is a floating window of a resolution; and
      a relative position of the first display region relative to the second display region of the multi-mode display device;
   output first display source data received via the first connection to the first display region at the relative position relative to the second display region; and
   output second display source data received via the second connection to the second display region.

7. The article of manufacture of claim 6, further comprising instructions to:
   send an indication of the second display region to the secondary display source.

8. The article of manufacture of claim 6, wherein the first display region is selected from:
   standard-wide resolution;
   ultra-wide resolution; and
   near-square resolution.

9. The article of manufacture of claim 6, wherein the instructions to output the second display source data received via the second connection includes instructions to perform at least one of:
   scale the second display source data to match the second display region; and
   set an orientation of the second display source data to match the second display region.

10. The article of manufacture of claim 6, prior to outputting the first display source data, further comprising instructions to:
   deactivate and activate the first connection;
   receive, via the first connection, a request for extended display identification data;
   generate the extended display identification data according to the first display region; and
   send, via the first connection, the extended display identification data.

11. A multi-mode monitor, comprising:
   a processor having access to a memory, wherein the memory stores instructions that, when executed by the processor, cause the processor to:
      detect, at the multi-mode monitor, a first connection to a primary display source;
      detect, at a wireless interface associated with the multi-mode monitor, a second connection to a secondary display source when the secondary display source is within operational proximity of the wireless interface;
      responsive to the detection of the second connection to the secondary display source, send display mode data to the primary display source to indicate which display modes are supported by the multi-mode monitor when simultaneously outputting display source data from the primary display source and the secondary display source;
      responsive to the instructions to send the display mode data, receive, from the primary display source, selection data indicating:
         a user-selected display mode based on the display mode data, wherein the user-selected display mode specifies a first display region of the multi-mode monitor and a second display region of the multi-mode monitor for simultaneously outputting display source data on the multi-mode monitor, wherein the first display region is the same resolution as an overall display resolution of the multi-mode display device and the second display region is a floating window of a resolution; and
         a relative position of the first display region relative to the second display region of the multi-mode display device;
      output first display source data received via the first connection to the first display region at the relative position relative to the second display region; and
      output second display source data received via the second connection to the second display region.

12. The multi-mode monitor of claim 11, further comprising instructions to:
   send an indication of the second display region to the secondary display source.

13. The multi-mode monitor of claim 11, wherein the first display region is selected from:
   standard-wide resolution, ultra-wide resolution, and near-square resolution.

14. The multi-mode monitor of claim 11, wherein the instructions to output the second display source data received via the second connection includes instructions to perform at least one of:
   scale the second display source data to match the second display region; and
   set an orientation of the second display source data to match the second display region.

15. The multi-mode monitor of claim 11, prior to outputting the first display source data, further comprising instructions to:
   deactivate and activate the first connection;
   receive, via the first connection, a request for extended display identification data;

generate the extended display identification data according to the first display region; and send, via the first connection, the extended display identification data.

* * * * *